(12) United States Patent
Furuta (10) Patent No.: US 8,416,325 B2
(45) Date of Patent: Apr. 9, 2013

(54) IMAGING APPARATUS AND COLOR CONTAMINATION CORRECTION METHOD

(75) Inventor: Yoshinori Furuta, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/509,786

(22) PCT Filed: Aug. 29, 2011

(86) PCT No.: PCT/JP2011/069482
§ 371 (c)(1),
(2), (4) Date: May 14, 2012

(87) PCT Pub. No.: WO2012/046522
PCT Pub. Date: Apr. 12, 2012

(65) Prior Publication Data
US 2012/0268635 A1   Oct. 25, 2012

(30) Foreign Application Priority Data

Oct. 4, 2010   (JP) .................................. 2010-225279

(51) Int. Cl.
*H04N 5/217*   (2011.01)
*H04N 5/228*   (2006.01)
*H04N 9/73*   (2006.01)
*H04N 5/335*   (2011.01)

(52) U.S. Cl.
USPC ..................... 348/241; 348/222.1; 348/223.1; 348/315; 348/317

(58) Field of Classification Search ............... 348/222.1, 348/223.1, 224.1, 225.1, 241, 266, 272, 273, 348/274, 275, 281, 282, 289, 290, 291, 292, 348/294, 302, 305, 311, 315, 317, 335, 336, 348/340, 342, 343, 344
See application file for complete search history.

(56) References Cited

U.S. PATENT DOCUMENTS 7,864,232 B2 *  1/2011  Kinoshita et al. ............. 348/272
8,035,709 B2 * 10/2011  Kinoshita ..................... 348/272
(Continued)

FOREIGN PATENT DOCUMENTS

JP   2001-078209 A   3/2001
JP   2007/142697 A   6/2007
(Continued)

OTHER PUBLICATIONS

International Search Report in PCT/JP2011/069482 dated Nov. 29, 2011(English Translation Thereof).

*Primary Examiner* — Chieh M Fan
*Assistant Examiner* — Peter Chon
(74) *Attorney, Agent, or Firm* — McGinn IP Law Group, PLLC (57) ABSTRACT

An imaging apparatus includes a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows; and an imaging device driving section for reading shot image signals of the pixels of the odd-numbered rows and shot image signals of the pixels of the even-numbered rows divisionally in separate frames. A color contamination correction is performed on a shot image signal of a pixel of attention using shot image signals of plural pixels around the pixel of attention among shot image signals, read out divisionally, of the pixels of one of the odd-numbered rows.

20 Claims, 10 Drawing Sheets

U.S. PATENT DOCUMENTS

| | | | |
|---|---|---|---|
| 8,094,232 B2 * | 1/2012 | Kusaka | 348/349 |
| 8,218,898 B2 * | 7/2012 | Subbotin | 382/275 |
| 2007/0146511 A1 | 6/2007 | Kinoshita et al. | |
| 2009/0316026 A1 | 12/2009 | Okumura | |
| 2011/0216228 A1 | 9/2011 | Kawamura et al. | |

FOREIGN PATENT DOCUMENTS

| | | |
|---|---|---|
| JP | 2009-141578 A | 6/2009 |
| JP | 2010-003869 A | 1/2010 |
| JP | 2011-061684 A | 3/2011 |

* cited by examiner

IMAGING APPARATUS AND COLOR CONTAMINATION CORRECTION METHOD

TECHNICAL FIELD

The present invention relates to an imaging apparatus incorporating a single-plate solid-state imaging device for taking a color image as well as to a color contamination correction method. More particularly, the invention relates to an imaging apparatus and a color contamination correction method which correct for color contamination between adjoining pixels.

BACKGROUND ART

In single-plate solid-state imaging devices, different color filters are stacked on adjoining pixels formed on the same photodetecting surface. Therefore, color contamination may caused by oblique incident light. Solid-state imaging devices are configured in such a manner that signal charges corresponding to quantities of light beams incident on plural photodiodes (pixels), respectively, which are arranged in two-dimensional array form on a semiconductor substrate are stored in the respective photodiodes and signals corresponding to the amounts of the stored charges are read out as shot image signals.

In the case of solid-state imaging devices for taking a color image, a color filter layer is stacked over a semiconductor substrate on which photodiodes are formed and microlenses for condensing incident light onto the photodiodes are provided on the color filter layer so as to correspond to the respective photodiodes. Since there is a distance between the photodiodes and the microlenses, if incident light shines obliquely on the photodetecting surface, incident light that has passed through a red filter, for example, may shine on, instead of a red detection photodiode, a blue or green detection photodiode that is adjacent to the red detection photodiode, resulting in color contamination. If color contamination occurs at many positions, the hue of a subject image is varied and the image quality is degraded.

In particular, in imaging apparatus incorporating a photographic lens having a small F value, color contamination occurring at peripheral pixels on the photodetecting surface of a solid-state imaging device has serious influence because a subject optical image shines on those pixels at large incident angles. In recent years, solid-state imaging devices called a back illumination type have come to be incorporated in digital cameras. Whereas having high shooting sensitivity by virtue of a large aperture ratio, back-illumination-type solid-state imaging devices have a considerable distance between microlenses and a color filter layer which are formed on the back surface side of a semiconductor substrate and photodiodes which are formed on the front surface side of the semiconductor substrate, which is a structure that is prone to color contamination.

Among conventional techniques for correcting for color contamination is one disclosed in the following Patent document 1. In this conventional color contamination correction technique, in performing correction processing on a detection signal of a certain pixel of attention using signals detected by pixels around the pixel of attention, correction parameters are used that are obtained taking into consideration that pixels located on a certain direction have greater influences on the pixel of attention, that is, the four pixels around the pixel of attention do not influence the pixel of attention isotropically.

PRIOR ART DOCUMENTS

Patent Documents
Patent document 1: JP-A-142697

SUMMARY OF THE INVENTION

Problems to Be Solved by the Invention

The color contamination correction is associated with a problem that processing takes long time because it is necessary to read a detection signal of each pixel of a solid-state imaging device and to perform correction processing using detection signals of pixels around each pixel. In particular, solid-state imaging devices incorporated in recent digital cameras have been increased in the number of pixels and solid-state imaging devices having ten million or more pixels are now common. Therefore, mere processing of reading shot image signals from the solid-state imaging device takes time. Performing color contamination correction on a pixel-by-pixel basis in addition to known image processing such as γ correction processing, RGB/YC conversion processing, etc. which are performed after reading of shot image signals further increases the processing time. As a result, an even longer time is necessary from an end of shooting to display (preview display) of a shot image on a liquid crystal display unit provided on the back side of a camera.

An object of the present invention is to provide an imaging apparatus and a color contamination correction method which can shorten a color contamination correction processing time while performing contamination correction with high accuracy.

Means for Solving the Problems

An imaging apparatus according to the invention is characterized by comprising a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows; an imaging device driving section for reading shot image signals of the pixels of the odd-numbered rows and shot image signals of the pixels of the even-numbered rows divisionally in separate frames; and a color contamination correcting section for performing a color contamination correction on a shot image signal of a pixel of attention using shot image signals of plural pixels around the pixel of attention among shot image signals, read out divisionally, of the pixels of one of the odd-numbered rows and the even-numbered rows in such a manner that a shot image signal of a pixel of the other of the odd-numbered rows and the even-numbered rows among the plural pixels is replaced by a shot image signal of a pixel of the one of the odd-numbered rows and the even-numbered rows that is adjacent to the pixel of the other of the odd-numbered rows and the even-numbered in an oblique direction and that has a color filter of the same color as the pixel of the other of the odd-numbered rows and the even-numbered rows.

A color contamination correction method to be performed on shot image signals produced by shooting by an imaging apparatus having a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows; and an imaging device driving section for reading shot image signals of the pixels of the odd-numbered rows and shot image signals of the pixels of the even-numbered rows divisionally in separate frames, characterized by performing a color contamination correction on a shot image signal of a pixel of attention using shot image signals of plural pixels around the pixel of attention among shot image signals, read out divisionally, of the pixels of one of the odd-numbered rows and the even-numbered rows in such a manner that a shot image signal of a pixel of the other of the odd-numbered rows and the even-numbered rows among the plural pixels is replaced by a shot image signal of a pixel of the one of the odd-numbered rows and the even-numbered rows that is adjacent to the pixel of the other of the odd-numbered rows and the even-numbered rows in an oblique direction and that has a color filter of the same color as the pixel of the other of the odd-numbered rows and the even-numbered rows.

Advantages of the Invention

The invention makes it possible to shorten a color contamination correction processing time while performing contamination correction with high accuracy.

BEST MODE FOR CARRYING OUT THE INVENTION

An embodiment of the present invention will be hereinafter described with reference to the drawings. Before the description of the embodiment, color contamination correction will be outlined.

Figure 1:
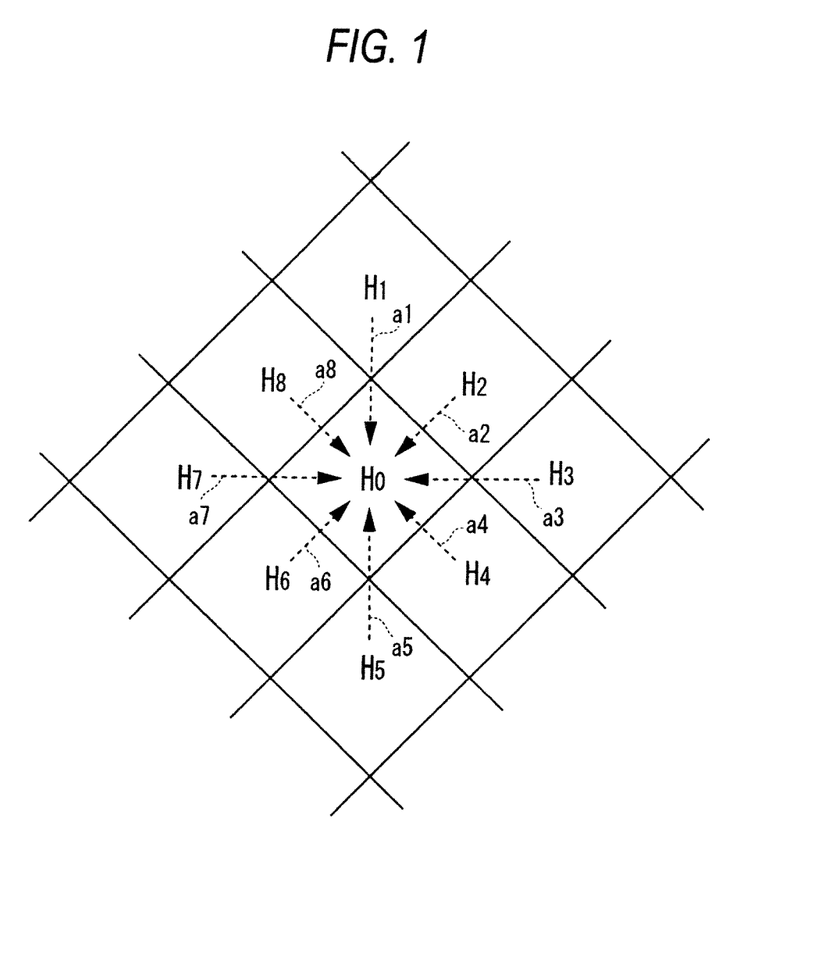
FIG. 1 illustrates an outline of color contamination correction.

FIG. 1 illustrates an outline of color contamination correction. Eight pixels H0-H8 are shown in the figure. Detection signal amounts of the respective pixels are also represented by H0-H8. Even if these pixels receive light having the same luminance, their detection signal amounts are different depending on the colors of color filters stacked on the respective pixels.

A solid-state imaging device to be described in the following embodiment has what is called a honeycomb pixel arrangement (pixel arrangement of FIG. 1) because the pixels on even-numbered rows are shifted from the pixels on odd-numbered rows by a half pixel pitch.

Light leaking from each of the neighboring eight pixels H1-H8 enters the pixel of attention H0 located at the center to cause color contamination (color filters are omitted in FIG. 1; color contamination occurs when the color filters of a neighboring pixel and the pixel of attention are different from each other).

The ratio of light leakage from the neighboring pixel Hi (i=1-8) to the center pixel H0 is assumed to be ai% (i=1-8). The detection signal amount of the center pixel H0 is increased by the leakage entrance beams, and the signal amount increase is considered to be proportional to the leakage entrance light amount.

Therefore, the erroneous detection signal amount due to the leakage light amounts from the eight neighboring pixel H1-H8 to the pixel of attention H0 is calculated as $$K=(H1\times a1+H2\times a2+H3\times a3+H4\times a4+H5\times a5+H6\times a6+H7\times a7+H8\times a8).$$

That is, of the detection amount H0 of the pixel of attention H0, the detection amount corresponding to the leakage entrance light beams amounts to K. The true detection signal amount of the pixel of attention H0 is H0−K. Color contamination correction is possible by performing this calculation.

The above-mentioned light leakage ratio ai (i=1-8) has a somewhat different value depending on whether light that has passed through the color filter is red (R) light, green (G) light, or blue (B) light because of the difference in the wavelength range of the light that has passed through the color filter. That is, a transparent insulating layer exists between the color filters and the photodiodes and its refractive index naturally varies depending on the wavelength of light entering it. Therefore, stated accurately, the ratio a2 of light leakage from the pixel H2, for example, to the pixel of attention H0 is expressed as a2(R)≠a2(G)≠a2(B).

Figure 2:
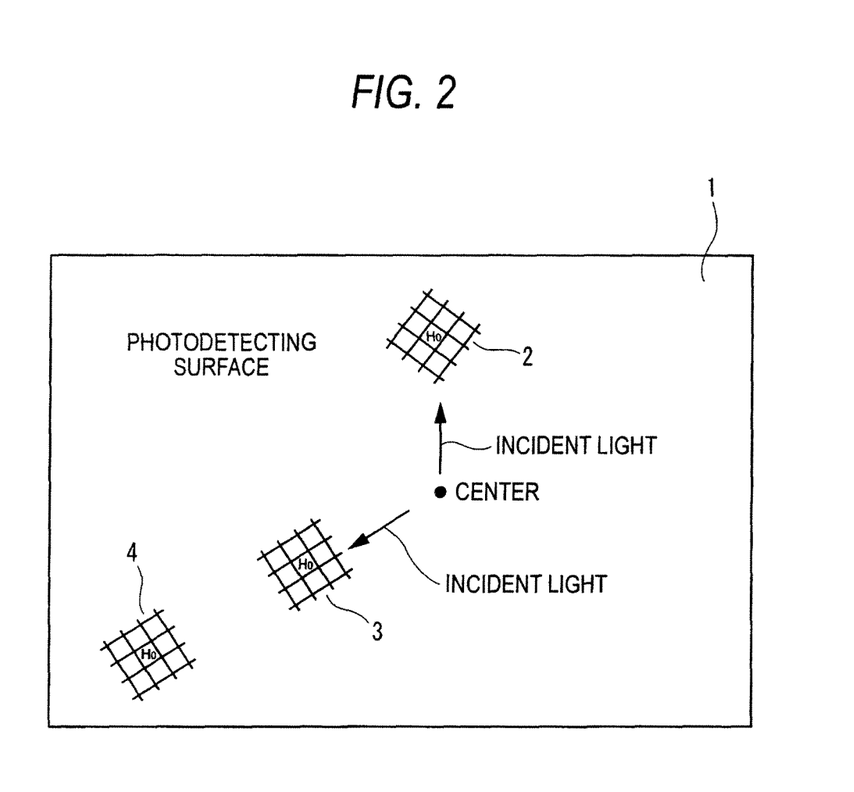
FIG. 2 illustrates how color contamination correction is performed differently on the photodetecting surface of a solid-state imaging device.

FIG. 2 shows an effective pixel area of the photodetecting surface of the solid-state imaging device. Whereas incident light coming from a photographic lens (not shown) shines squarely on the center of the photodetecting surface 1, the incident light shines on the photodetecting surface 1 more obliquely as the entrance position comes closer to the periphery. In the case of color contamination correction for a pixel of attention H0 that is located over the center of the photodetecting surface 1 in the vertical direction, incident light comes in the direction from the pixel H5 to the pixel H0 (see FIG. 1). It is therefore considered that the ratio a5 of light leakage from the pixel H5 to the pixel of attention H0 is largest and the ratio al of light leakage (due to diffused reflection) fro the pixel H1 to the pixel of attention H0 is smallest.

At position 3 which is located on a bottom-left direction originating from the center of the photodetecting surface 1, incident light comes in the direction from the pixel H2 to the pixel of attention of attention H0 (see FIG. 1). It is therefore considered that the ratio a2 of light leakage from the neighboring pixel H2 to the pixel of attention H0 is largest and the ratio a6 of light leakage from the neighboring pixel H6 to the pixel of attention H0 is smallest.

At position 4 which is even closer to the periphery than position 3, incident light likewise comes in the direction from the pixel H2 to the pixel of attention H0 (see FIG. 1). It is therefore considered that the ratio a2 of light leakage from the neighboring pixel H2 to the pixel of attention H0 is largest. However, the incident angle of the incident light shining on position 4 is larger than that of the incident light shining on position 3, that is, the incident light shines on position 4 more obliquely. Therefore, the light leakage ratio a2 is larger at position 4 than at position 3.

Although approximate values of the light leakage ratios ai (i=1-8) at each position on the photodetecting surface 1 vary depending on the structure (presence/absence of inner lenses, the size of each pixel, the distance between the microlenses/color filters and the photodiodes, and other factors) of the solid-state imaging device, they can be known in advance by, for example, conducting an experiment. And the individual leakage ratios ai at each position on the photodetecting surface can be calculated by a simulation. Color contamination correction can be performed at high speed if such leakage ratios ai are held in advance as correction parameters.

However, if color contamination correction is performed on a pixel-by-pixel basis by the above-described method, the color contamination correction of each pixel cannot be performed unless detection signal amounts of all the neighboring pixels are known. It is therefore difficult to attain correction of even higher speed. In view of this, in the embodiment, a digital signal processing section 26 performs color contamination correction by the following method according to instructions from a CPU 29.

Figure 3:
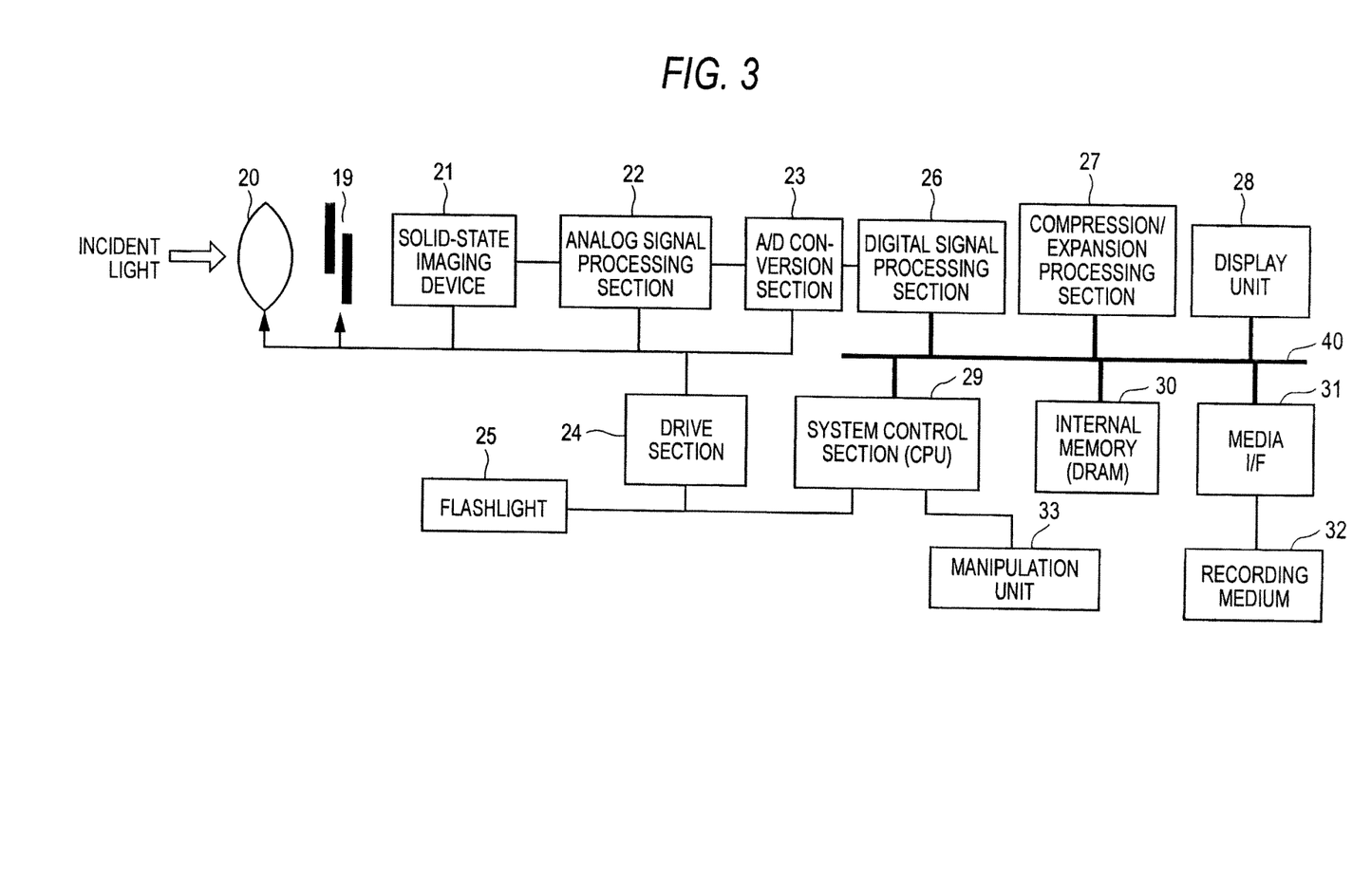
FIG. 3 is a functional block configuration diagram of an imaging apparatus according to an embodiment of the present invention.

FIG. 3 is a functional block diagram of an imaging apparatus according to an embodiment of the invention. The example imaging apparatus according to the embodiment is a digital camera 15 for taking a still image of a moving image of a subject. The digital camera 15 is equipped with a photographic lens 20, a solid-state imaging device 21 disposed behind the photographic lens 20 in its image forming plane, a lens shutter 19 disposed between the photographic lens 20 and the solid-state imaging device 21, an analog signal processing section 22 for performing analog processing such as automatic gain control (AGC) and correlated double sampling processing on analog image data that is output from the solid-state imaging device 21, an analog-to-digital conversion section (A/D) 23 for converting analog image data that is output from the analog signal processing section 22 into digital image data, a drive control section 24 (including a timing generator) for drive-controlling the A/D 23, the analog signal processing section 22, the solid-state imaging device 21, the photographic lens 20, and the lens shutter 19 according to instructions from a system control section (CPU) 29 (described later), and a flashlight 25 for emitting light according to an instruction from the CPU 29.

The digital camera 15 according to the embodiment is also equipped with the digital signal processing section 26 for taking in the digital image data that is output from the A/D 23 and performs interpolation processing, white balance correction, RGB/YC conversion processing, color contamination correction processing, etc., an compression/expansion processing section 27 for compressing image data into image data of the JPEG format or the like or, conversely, expanding image data, a display unit 28 for displaying a menu or the like, a through-the-lens image, or a shot image, the system control section (CPU) 29 for supervising the entire digital camera 15, an internal memory 30 such as a frame memory, a media interface (I/F) 31 for performing interface processing with a recording medium 32 for storing JPEG image data etc., and a bus 40 which connects the above sections and units. A manipulation unit 33 for receiving a manipulation input from the user is connected to the system control section 29.

In the above example solid-state imaging device 21 which is of the CCD type, an output signal of the solid-state imaging device 21 is processed by the analog signal processing section (AFE: analog front end) 22 which is provided outside the solid-state imaging device 21. The solid-state imaging device 21 may be a CMOS solid-state imaging device. Where the solid-state imaging device 21 is of the CMOS type, the AFE is commonly incorporated in the solid-state imaging device.

The pixel arrangement of the solid-state imaging device 21 is not a square lattice arrangement but what is called a honeycomb arrangement in which the pixels on even-numbered rows are shifted from the pixels on odd-numbered rows by a half pixel pitch. The color filter arrangement is also characteristic.

Figure 4:
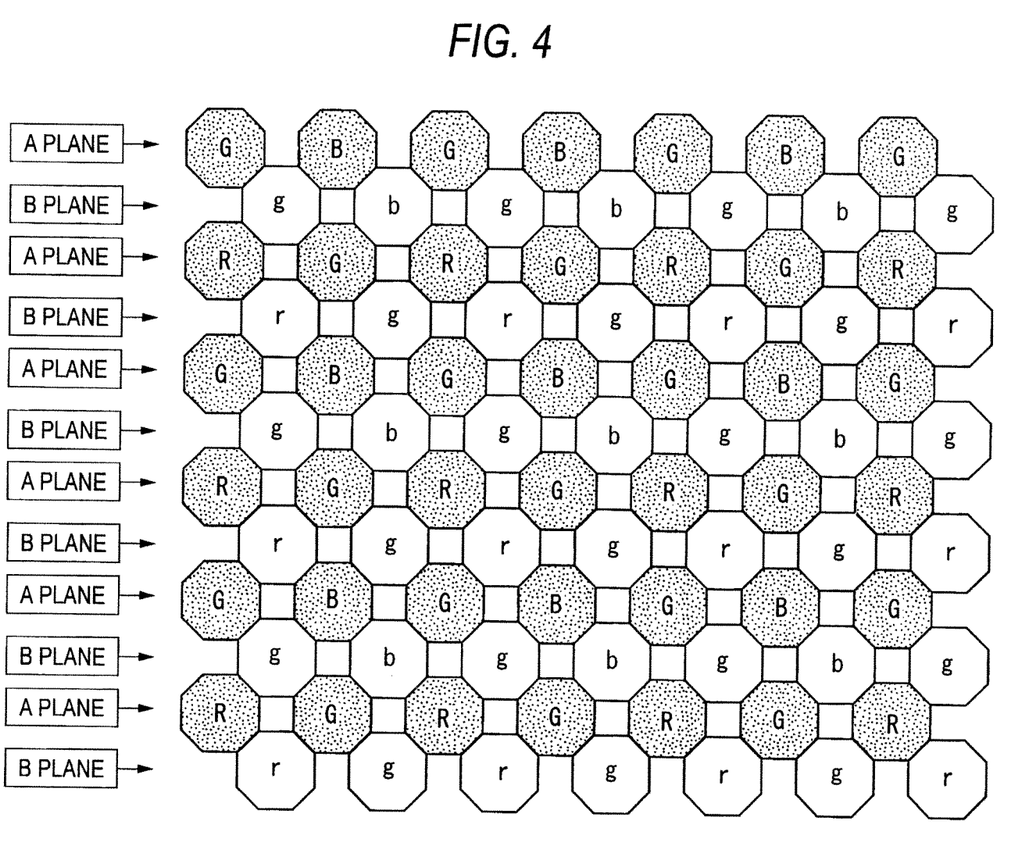
FIG. 4 is a schematic diagram (color filter arrangement diagram) of the surface of a solid-state imaging device shown in FIG. 3.

FIG. 4 is a schematic diagram of the surface of the solid-state imaging device 21. Individual pixels (photodiodes: omitted in the figure) formed on a semiconductor substrate are arranged in honeycomb form and color filters (R and r: red; G and g: green; and B and b: blue) are stacked on the respective pixels.

When attention is paid to only the pixels on the odd-numbered rows, they are arranged in square lattice form and the color filters R, G, and B are Bayer-arranged. Likewise, when attention is paid to only the pixels on the even-numbered rows, they are arranged in square lattice form and the color filters r, g, and b are Bayer-arranged. As a result, a pair of pixels that are adjacent to each other in an oblique direction have filters of the same color (R, r), (G, g), or (B, b).

The pixels having the color filters denoted by the capital letters R, G, and B are A-plane (first-group) pixels, and the pixels having the color filters denoted by the small letters r, g, and b are B-plane (second-group) pixels. Although the color filters R and r are entirely the same, the color filters G and g are entirely the same, and the color filters B and b are entirely the same, the capital letters and the small letters are used to discriminate between a subject image taken only by the A-plane pixels and a subject image taken only by the B-plane pixels.

The solid-state imaging device 21 having the above-described pixel arrangement and color filter arrangement can take a subject image as described below.

The A-plane pixels and the B-plane pixels are exposed to light during the same period, and an output signal of the A-plane pixels and an output signal of the B-plane pixels are amplified by the analog signal processing section (AFE) shown in FIG. 1. At this time, the output signal of the A-plane pixels and the output signal of the B-plane pixels are gain-controlled with the same gain. As a result, the signal expression width (dynamic range) of the A-plane pixels is made the same as that of the B-plane pixels.

A shot image of the A-plane pixels and a shot image of the B-plane pixels are the same images that are shifted from each other by one pixel in pixel positions. Therefore, the signal amount is doubled if signals of pixels of the same color that are adjacent to each other in an oblique direction are added together. High-sensitivity shooting is thus enabled. However, naturally, a high-resolution subject image whose number of pixels is equal to the sum of the number of A-plane pixels and the number of B-plane pixels can be formed if such pixel signal addition is not performed.

Shot image signals may be read from the solid-state imaging device 21 in such a manner that a shot image signal of all the A-plane pixels is read out first and a shot image signal of all the B-plane pixels is then read out. In this case, a preview image can be formed from the shot image signal of the A-plane pixels and displayed on the liquid crystal display unit 28. Alternatively, in taking a moving image, a subject image may be generated from shot image signals of only the A-plane pixels, in which case the number of pixels is halved and hence a moving image can be taken at a high frame rate. In this case, a preview image is formed and a moving image is generated by performing color contamination correction in a manner described later.

Figure 5:
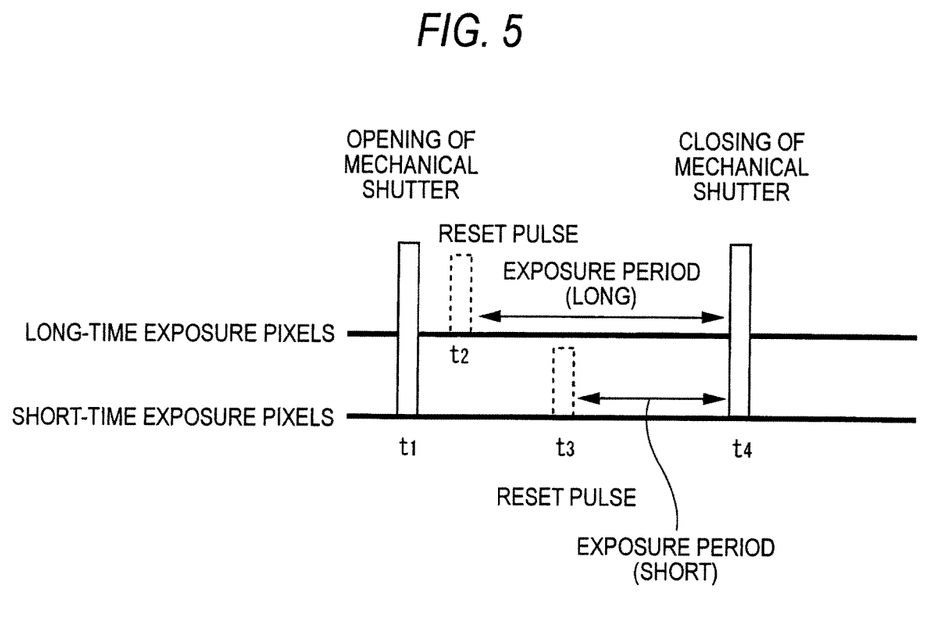
FIG. 5 illustrates long-time exposure and short-time exposure.

Furthermore, a subject image with a widened dynamic range can be obtained using the solid-state imaging device 21 having the above-described pixel arrangement and color filter arrangement. For example, as shown in FIG. 5, the mechanical lens shutter 19 shown in FIG. 3 is opened at time t1. At a following time t2, a reset signal is applied to the A-plane pixels to start exposure of them. At an arbitrary delayed time t3, a reset signal is applied to the B-plane pixels to start exposure of them. At time t4, the lens shutter 19 is closed to finish the exposure of all the pixels. As a result, the A-plane pixels are exposed for a long time (exposure period: t2 to t4) and the B-plane pixels are exposed for a short time (exposure period: t3 to t4).

Reading is performed on all of the A-plane pixels (or B-plane pixels) in a first frame, and reading is performed on all of the B-plane pixels (or A-plane pixels) in a following second frame. An output signal of the A-plane pixels and an output signal of the B-plane pixels are amplified at the same gain by the analog signal processing section (AFE) 22. As a result, the signal expression width of the B-plane pixels which have been subjected to the short time exposure becomes two times as great as that of the A-plane pixels.

Therefore, the dynamic range of a subject image can be widened by adding together shot image signals of an A-plane pixel and a B-plane pixel of the same color that are adjacent to each other in an oblique direction.

As described above, the solid-state imaging device is used in which the first-group pixels (A-plane pixels) and the second-group pixels (B-plane pixels) are formed on the same photodetecting surface in mixture, color filters of the same color are stacked on a first-group pixel and a second-group pixel that are adjacent to each other and constitute a pair of pixels, and the color filters are Bayer-arranged as a whole. And shot image signals of the A-plane pixels and shot image signals of the B-plane pixels are read out in a divisional manner. Furthermore, in the following manner, color contamination correction on an A-plane shot image is performed using only shot image signals of the A-plane pixels and color contamination correction on a B-plane shot image is performed using only shot image signals of the B-plane pixels.

Figure 6:
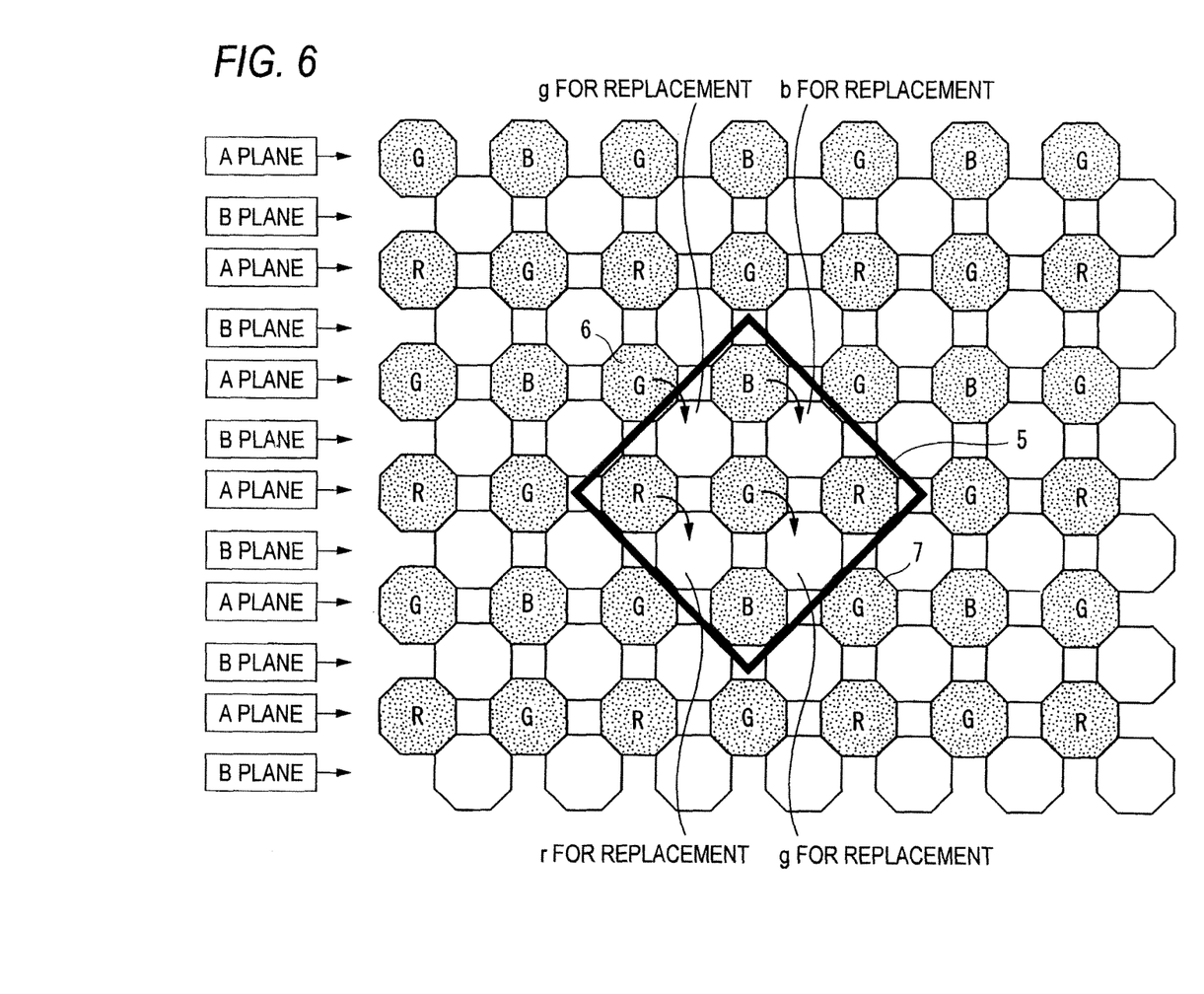
FIG. 6 shows only A-plane pixels shown in FIG. 4.

FIG. 6 shows shot image signals of the A-plane pixels using symbols R, G, and B. No symbols are written at the positions of the B-plane pixels because they have no corresponding shot image signals. A description will be made of color contamination correction on a detection signal of, for example, the central G pixel (i.e., the pixel having a G filter) that is enclosed by a rectangular frame 5 in the figure.

Compare the nine pixels enclosed by the rectangular frame 5 in FIG. 6 with the pixels shown in FIG. 1. A signal of the G pixel H0 which is located at the center in FIG. 1, a signal of the B pixel H1 (top neighboring pixel), a signal of the R pixel H3 (right neighboring pixel), and a signal of the R pixel (bottom neighboring pixel) exist in the rectangular frame 5, but detection signals of the pixels H2, H4, H6, and H8 shown in FIG. 1 do not exit because they have not read out yet.

In the above description, the term "B pixel" means a pixel having a blue (B) filter and is not a "B-plane pixel" as mentioned above.

The color contamination correction that was described above with reference to FIG. 1 requires signals of the eight neighboring pixels H1-H8 and hence lacks signals of the pixels H2, H4, H6, and H8. As seen from comparison between FIGS. 4 and 6, the color of the color filter of the pixel H8 is green (g). It is highly probable that pixels that are adjacent to each other in an oblique direction and on which filters of the same color are stacked have the same reception light quantity because they are distant from each other by the one-pixel size (e.g., 2 μm) at the maximum.

Therefore, it suffices that color contamination correction be performed using a detection signal of the adjacent pixel of the same color in place of a detection signal of the pixel H8. Either the detection signal of the pixel of attention H0 of the same color or the detection signal of a pixel 6 of the same color (see FIG. 6) may be used in place of the detection signal of the pixel H8. Likewise, either the detection signal of the pixel of attention H0 of the same color or the detection signal of a pixel 7 of the same color (see FIG. 6) may be used in place of the detection signal of the pixel H4.

As seen from comparison with FIG. 6, the pixel H2 shown in FIG. 1 has a blue (b) filter. Therefore, the detection signal of the B pixel H1 which is paired with and is of the same color as the pixel (b pixel) having this blue (b) filter can be used in place of that of the pixel H2. Likewise, the detection signal of the pixel H7 having an R filter (same color) can be used in place of that of the pixel H6 shown in FIG. 1.

In this manner, in the solid-state imaging device 21 whose pixel arrangement and color filter arrangement are such that a pixel that is paired with and is of the same color as each pixel necessarily exists in an oblique direction, detection signals of the eight pixels around a pixel of attention can be known (four of which are actual detection signals and the remaining four of which are replacement signals) even if signals are read from only the pixels on the odd-numbered rows or the even-numbered rows. Therefore, color contamination correction can be performed using the eight light leakage ratios a1-a8 which were described above with reference to FIG. 1, whereby a subject image can be obtained in which color contamination has been reduced with high accuracy.

In the above description, detection signals to be obtained at B-plane pixel positions are replaced by detection signals of only A-plane pixels. However, since the only difference between the A-plane pixels and the B-plane pixels is a shift in their positions, it goes without saying that, conversely, detection signals to be obtained at A-plane pixel positions can be replaced by detection signals of only B-plane pixels. Furthermore, although in the above description the G pixel is used as the pixel of attention H0, similar correction is possible even if an R pixel or a B pixel is used as a pixel of attention (only the direction on which a detection signal replacement pixel exists is changed).

Figure 7:
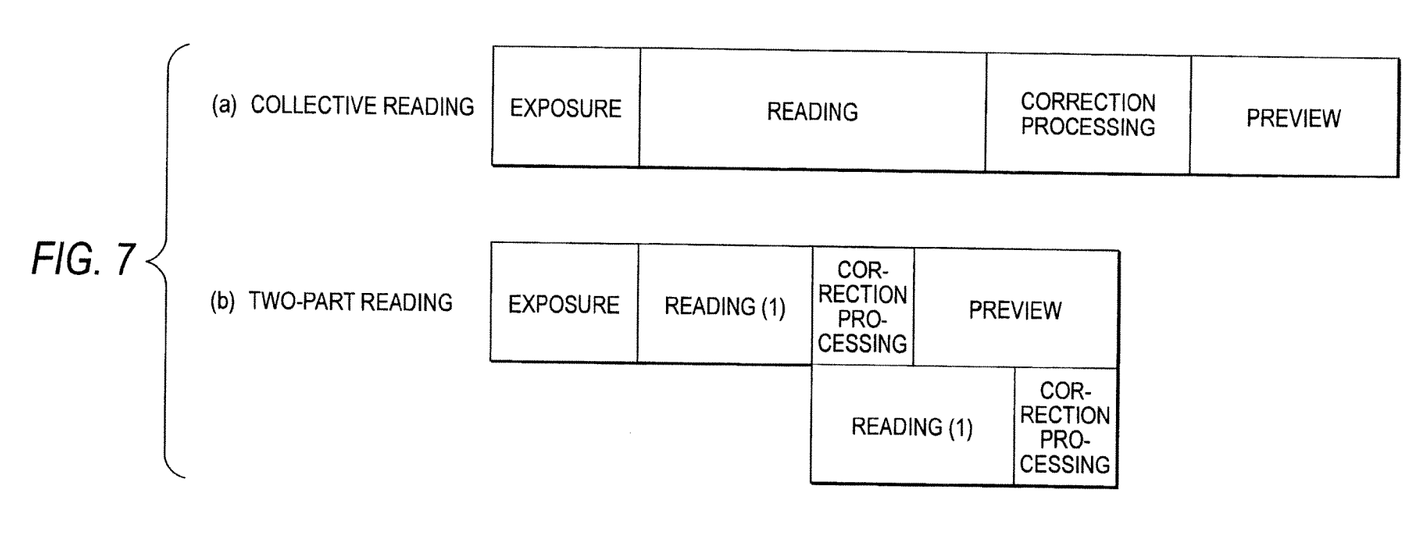
FIG. 7 illustrates advantages of divisional reading according to the embodiment of the invention.

FIG. 7 illustrates advantages of the above-described color contamination correction. Where shot image signals of the A-plane pixels and shot image signals of the B-plane pixels are read in one frame without division (see FIG. 7(a)), known image processing and color contamination correction are performed after reading of shot image signals of all the pixels and preview display is performed thereafter. Therefore, considerable time is taken until the preview display.

In contrast, where reading from the A-plane pixels and reading from the B-plane pixels are performed in a divisional manner (see FIG. 7(b)) image processing and color contamination correction can be performed using shot image signals that are read from the A-plane pixels and shot image signals can be read from the B-plane pixels parallel with these image processing and color contamination correction. A preview image generated from the shot image signals of the A-plane pixels is displayed after completion of the color contamination correction etc. for the A-plane pixels, and image processing and color contamination correction can be performed using shot image signals of the B-plane pixels parallel with the preview image display. Therefore, the overall processing time can be shortened.

As described above with reference to FIG. 2, the values of the light leakage ratios ai (i=1-8) as the correction parameters depend on the position on the photodetecting surface of the solid-state imaging device 21. More accurately, those values depend on the address of each pixel on the photodetecting surface. However, if correction parameters need to be held for the address of each pixel, a memory for holding the correction parameters is required to have an enormous capacity. Furthermore, the necessary capacity is tripled if correction parameters (light leakage ratios) ai(R), ai(G), and ai(B) for R, G, and B need to be held.

Figure 8:
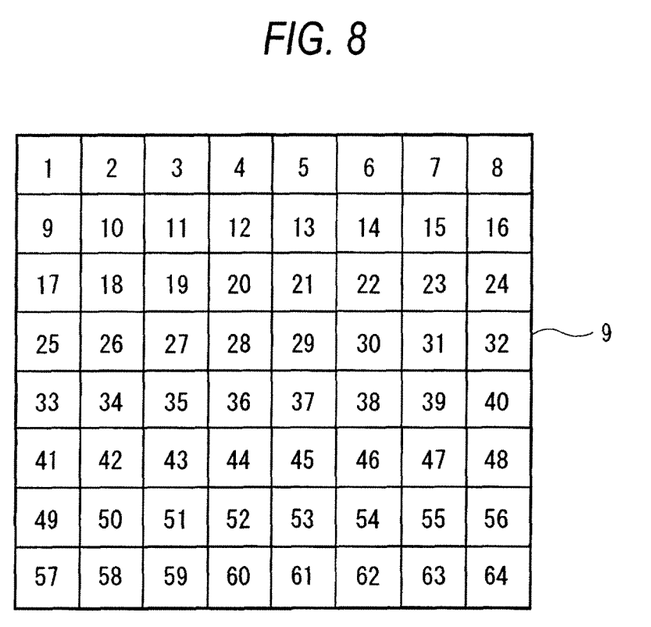
FIG. 8 illustrates a correction table.

In view of the above, in the following embodiment, the photodetecting surface 1 shown in FIG. 2 is divided into plural regions, for example, 64 (8×8) divisional regions. Correction parameters ai (i=1-8) corresponding to each divisional region are held as a table 9 shown in FIG. 8 which corresponds to that divisional region, and is stored in advance in a ROM (not shown) incorporated in the CPU 29 shown in FIG. 3. Correction parameters for the center coordinates of each divisional region are set for that divisional region, and correction parameter values for each of the other sets of coordinates in that divisional region are generated through linear interpolation between divisional regions which uses their sets of center coordinates. This prevents a phenomenon that the correction parameter values vary steeply at the boundary between divisional regions to cause a visible step as a correction mark.

In this manner, the memory capacity for storing the correction parameters ai can be reduced. To reduce the memory capacity further, instead of the sets of correction parameters corresponding to the 64 (8×8) respective divisional regions shown in FIG. 8, sets of correction parameters corresponding to only the divisional regions located at the positions of a checkered pattern may be held. Sets of correction parameters corresponding to the divisional regions located at the other positions of the checkered pattern are determined through linear interpolation calculations. As a further alternative, instead of holding respective sets of correction parameters for R, G, and B, one common set of correction parameters may be held for R, G, and B, which reduces the memory capacity by a factor of 3. The memory capacity can also be reduced by holding one common set of correction parameters ai (RGB) in a central area of the photodetecting surface and holding ai (R), ai (G), and ai (B) (ai (R)≠ai (G)≠and ai (B)) in a peripheral area.

Another measure will be described below. In the rectangular frame 5 shown in FIG. 6, the pixels located on both sides of the center pixel G are R pixels (same color). If the correction parameters (light leakage ratios) a3 and a7 for the right and left R pixels can be made identical, one of them can be omitted to reduce the memory capacity. Likewise, if the replacement pixels g Located at the top-left position and the bottom-right position are of the same color, if the correction parameters a8 and a4 can be made identical, one of them can be omitted to reduce the memory capacity. The same is true of the top and bottom B pixels. For example, in the divisional regions 28, 29, 36, and 37 shown in FIG. 8 which are located in a central region of the photodetecting surface and are close to the optical axis of the photographic lens, incident light shines on the photodetecting surface approximately perpendicularly. Therefore, it is highly probable that events of color contamination from neighboring pixels occur isotropically approximately to the same degree, and hence the ratios of light leakage from pixels of the same color be made approximately the same.

For example, two adjoining divisional regions (e.g., the divisional regions 1 and 9 shown in FIG. 8) have different sets of correction parameters, correction noise may occur in a boundary portion between the divisional regions 1 and 9. To prevent such noise, in the boundary portion, color contamination correction may be performed using (sets of) correction parameters obtained by performing an interpolation calculation involving the sets of correction parameters of the divisional regions 1 and 9.

Figure 9:
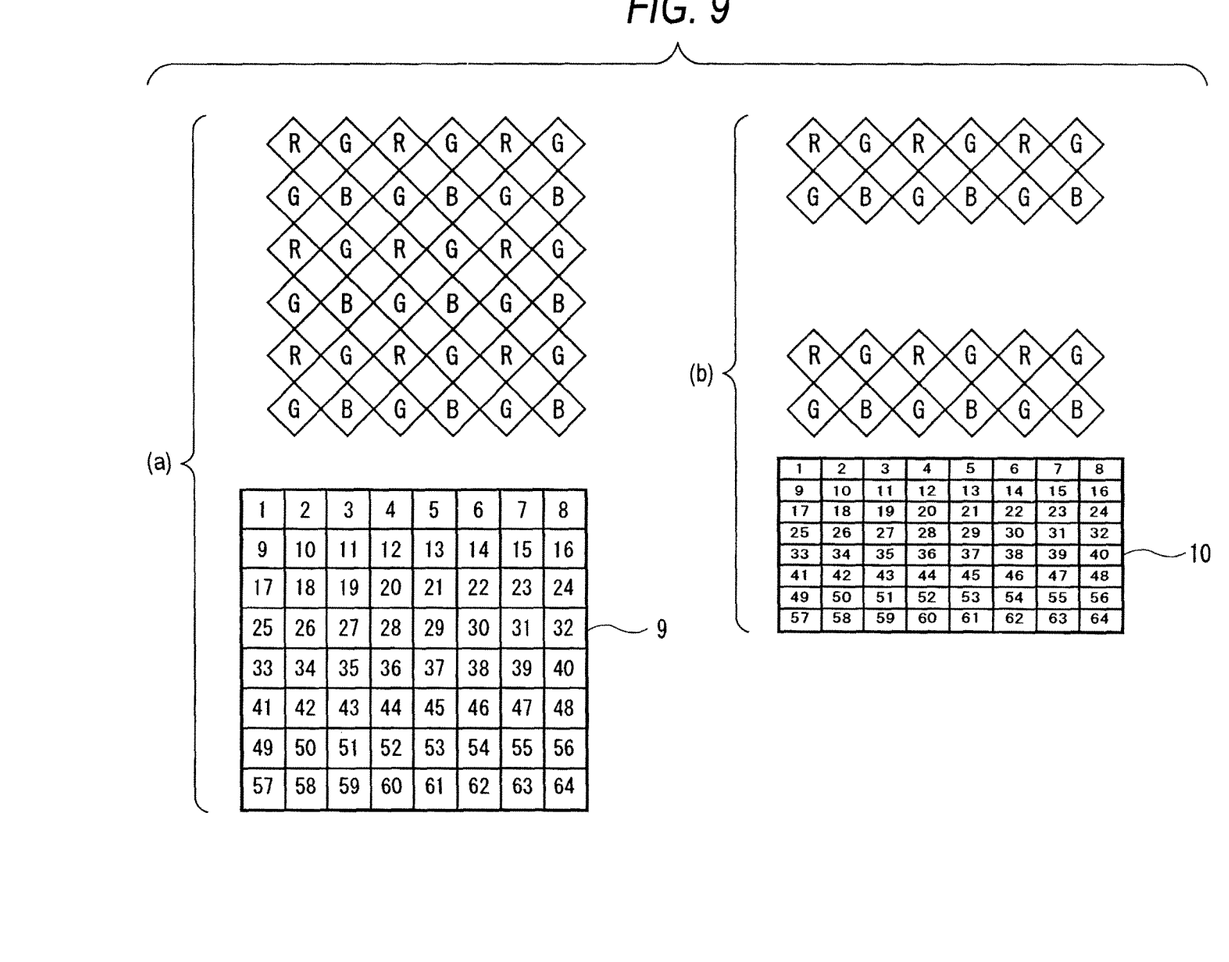
FIG. 9 illustrates relationships between thinned reading and a correction parameter table.

FIG. 9 illustrates cases of thinned reading. As for taking of a subject image through driving of the solid-state imaging device 21, either a subject image taken by all the pixels (see the top part of FIG. 9 (a)); only the A-plane pixels are shown) is read out or thinned reading is performed (see the top part of FIG. 9 (b) ) is read. It is not necessary to prepare a correction parameter table 10 for thinned reading as shown in the bottom part of FIG. 9 (b) to provide for such thinned reading. Such thinned reading can be performed by reading necessary sets of parameters from a table for all pixel reading shown in the bottom part of FIG. 9 (a). Such diverted use makes it unnecessary to prepare the unnecessary table 10 and hence can save a memory capacity for storage of the table 10.

Figure 10:
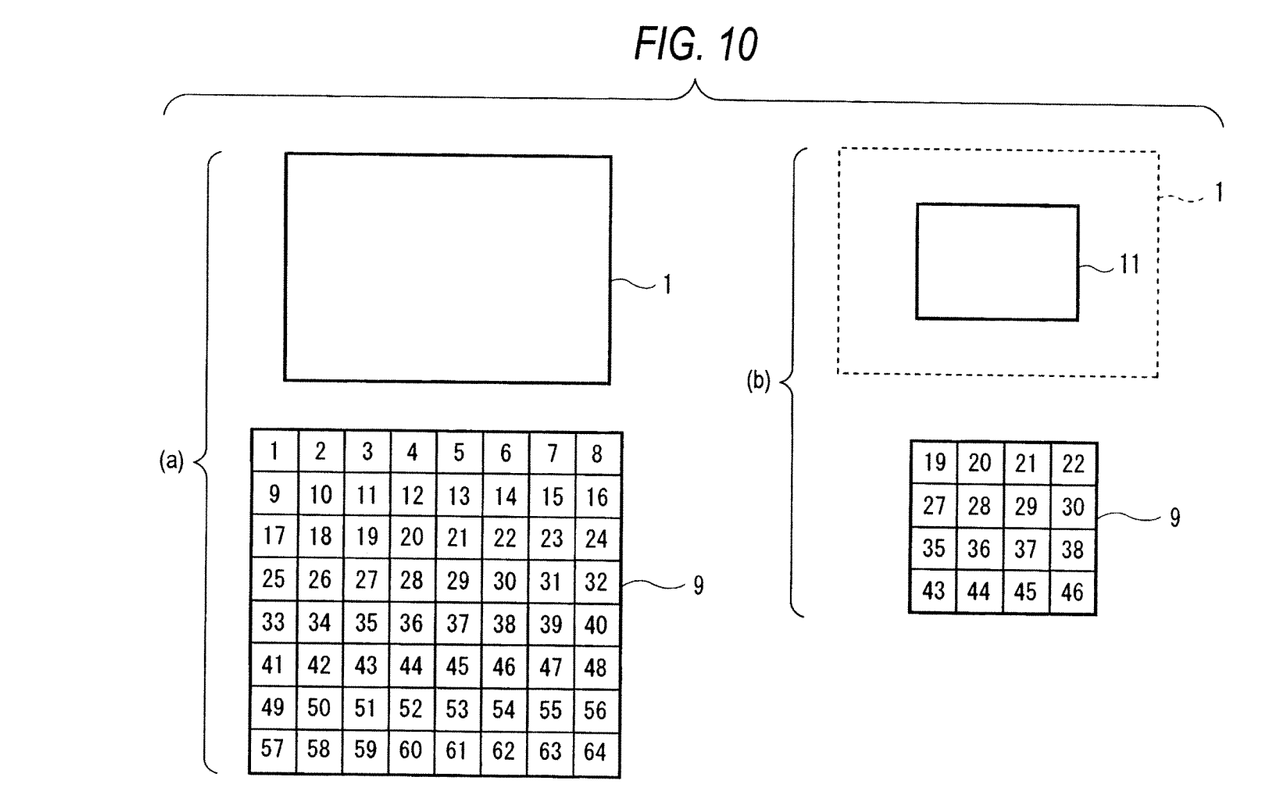
FIG. 10 illustrates a relationship between cut-out reading and a correction parameter table.

FIG. 10 illustrates a case that a necessary portion of a subject image is cut out and read out. For example, in reading a subject image obtained by digital zooming, color contamination correction may be performed by using the sets of correction parameters of a table portion 12 which corresponds to a cutting-out range 11 shown in the top part of FIG. 10 (a) and is acquired by diverting the corresponding potion of a table 9 which is prepared for all the photodetecting surface 1 (see FIG. 19(a)).

In the above-described embodiments, the CPU 29 which is incorporated in the imaging apparatus performs color contamination correction using the subordinate digital signal processing section 26 etc. However, an alternative configuration is possible in which the imaging apparatus takes a subject image to produce raw data and an external personal computer performs color contamination correction in development of the raw data. In this case, the personal computer can perform the correction by acquiring stored table data of correction parameters.

Of the imaging apparatus and the color contamination correction method according to the above-described embodiments, the color contamination correction method is to be performed on shot image signals produced by shooting by an imaging apparatus having a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows; and an imaging device driving section for reading shot image signals of the pixels of the odd-numbered rows and shot image signals of the pixels of the even-numbered rows divisionally in separate frames. The color contamination correction method is characterized by performing a color contamination correction on a shot image signal of a pixel of attention using shot image signals of plural pixels around the pixel of attention among shot image signals, read out divisionally, of the pixels of one of the odd-numbered rows and the even-numbered rows in such a manner that a shot image signal of a pixel of the other of the odd-numbered rows and the even-numbered rows among the plural pixels is replaced by a shot image signal of a pixel of the one of the odd-numbered rows and the even-numbered rows that is adjacent to the pixel of the other of the odd-numbered rows and the even-numbered rows in an oblique direction and that has a color filter of the same color as the pixel of the other of the odd-numbered rows and the even-numbered rows.

The imaging apparatus and the color contamination correction method according to the embodiments are characterized in that the color contamination correction is performed by multiplying the shot image signals of the pixels around the pixel of attention by light leakage ratio correction parameters.

The imaging apparatus and the color contamination correction method according to the embodiments are characterized in that the correction parameters are predetermined for sets of coordinates on the photodetecting surface.

The imaging apparatus and the color contamination correction method according to the embodiments are characterized in that sets of correction parameters are determined for plural respective divisional regions of the photodetecting surface.

The imaging apparatus and the color contamination correction method according to the embodiments are characterized in that the correction parameters are determined according to a direction of incident light and a position of the pixel of attention with respect to the center of the photodetecting surface.

The imaging apparatus and the color contamination correction method according to the embodiments are characterized in that the value of the correction parameter for each of the pixels around the pixel of attention varies depending on the color of a color filter associated with the pixel around the pixel of attention.

The imaging apparatus and the color contamination correction method according to the embodiments are characterized in that sets of correction parameters are held as table data.

The imaging apparatus and the color contamination correction method according to the embodiments are characterized in that correction parameters of plural pixels having color filters of the same color among the pixels around the pixel of attention have the same value in common.

The imaging apparatus and the color contamination correction method according to the embodiments are characterized in that color contamination correction is performed on shot image signals that are read from the solid-state imaging device in a thinned manner using values of sets of correction parameters that are provided for the entire effective pixel area of the photodetecting surface.

The imaging apparatus and the color contamination correction method according to the embodiments are characterized in that when shot image signals of a partial area of the entire effective pixel area of the photodetecting surface are cut out, color contamination correction for the partial area is performed using values of sets of correction parameters that are provided for the entire effective pixel area of the photodetecting surface.

The above-described embodiments make it possible to perform color contamination correction with high accuracy and to perform color contamination correction processing at high speed.

Industrial Applicability

Capable of high-accuracy and high-speed correction, the color contamination correction method according to the invention is useful when applied to digital still cameras, digital video cameras, and digital cameras of cell phones with a camera, small electronic apparatus with a camera, etc.

Although the invention has been described in detail by referring to the particular embodiments, it is apparent to a person skilled in the art that various changes and modifications are possible without departing from the spirit and scope of the invention.

The present application is based on the Japanese application filed on Oct. 4, 2010 (Japanese Patent Application No. 2010-225279), the disclosure of which is incorporated herein by reference.

Description of Symbols

1: Effective pixel area of photodetecting surface
2, 3, 4: Position on photodetecting surface
5: Rectangular frame
9: Correction table
20: Photographic lens
21: Solid-state imaging device
26: Digital signal processing section
28: Display unit
29: System control section

The invention claimed is:

1. An imaging apparatus comprising:
a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows;
an imaging device driving section for reading shot image signals of the pixels of the odd-numbered rows and shot image signals of the pixels of the even-numbered rows divisionally in separate frames; and
a color contamination correcting section for performing a color contamination correction on a shot image signal of a pixel of attention using shot image signals of plural pixels around the pixel of attention among shot image signals, read out divisionally, of the pixels of one of the odd-numbered rows and the even-numbered rows in such a manner that a shot image signal of a pixel of the other of the odd-numbered rows and the even-numbered rows among the plural pixels is replaced by a shot image signal of a pixel of the one of the odd-numbered rows and the even-numbered rows that is adjacent to the pixel of the other of the odd-numbered rows and the even-numbered rows in an oblique direction and that has a color filter of the same color as the pixel of the other of the odd-numbered rows and the even-numbered rows.

2. The imaging apparatus according to claim 1, wherein the color contamination correction is performed by multiplying the shot image signals of the pixels around the pixel of attention by light leakage ratio correction parameters.

3. The imaging apparatus according to claim 2, wherein the correction parameters are predetermined for sets of coordinates on the photodetecting surface.

4. The imaging apparatus according to claim 3, wherein sets of correction parameters are determined for plural respective divisional regions of the photodetecting surface.

5. The imaging apparatus according to claim 2, wherein the correction parameters are determined according to a direction of incident light and a position of the pixel of attention with respect to the center of the photodetecting surface.

6. The imaging apparatus according to claim 2, wherein the value of the correction parameter for each of the pixels around the pixel of attention varies depending on the color of a color filter associated with the pixel around the pixel of attention.

7. The imaging apparatus according to claim 2, wherein sets of correction parameters are held as table data.

8. The imaging apparatus according to claim 2, wherein correction parameters of plural pixels having color filters of the same color among the pixels around the pixel of attention have the same value in common.

9. The imaging apparatus according to claim 2, wherein color contamination correction is performed on shot image signals that are read from the solid-state imaging device in a thinned manner using values of sets of correction parameters that are provided for the entire effective pixel area of the photodetecting surface.

10. The imaging apparatus according to claim 2, wherein when shot image signals of a partial area of the entire effective pixel area of the photodetecting surface are cut out, color contamination correction for the partial area is performed using values of sets of correction parameters that are provided for the entire effective pixel area of the photodetecting surface.

11. A color contamination correction method to be performed on shot image signals produced by shooting by an imaging apparatus having:
   a solid-state imaging device which is provided with plural pixels arranged in two-dimensional array form on a photodetecting surface of a semiconductor substrate, pixels on even-numbered rows are shifted from pixels on odd-numbered rows by a half pixel pitch, color-filters are Bayer-arranged over the respective pixels of the odd-numbered rows, and color-filters are Bayer-arranged over the respective pixels of the even-numbered rows; and
   an imaging device driving section for reading shot image signals of the pixels of the odd-numbered rows and shot image signals of the pixels of the even-numbered rows divisionally in separate frames, characterized by:
   performing a color contamination correction on a shot image signal of a pixel of attention using shot image signals of plural pixels around the pixel of attention among shot image signals, read out divisionally, of the pixels of one of the odd-numbered rows and the even-numbered rows in such a manner that a shot image signal of a pixel of the other of the odd-numbered rows and the even-numbered rows among the plural pixels is replaced by a shot image signal of a pixel of the one of the odd-numbered rows and the even-numbered rows that is adjacent to the pixel of the other of the odd-numbered rows and the even-numbered rows in an oblique direction and that has a color filter of the same color as the pixel of the other of the odd-numbered rows and the even-numbered rows.

12. The color contamination correction method according to claim 11, wherein the color contamination correction is performed by multiplying the shot image signals of the pixels around the pixel of attention by light leakage ratio correction parameters.

13. The color contamination correction method according to claim 12, wherein the correction parameters are predetermined for sets of coordinates on the photodetecting surface.

14. The color contamination correction method according to claim 13, wherein sets of correction parameters are determined for plural respective divisional regions of the photodetecting surface.

15. The color contamination correction method according to claim 12, wherein the correction parameters are determined according to a direction of incident light and a position of the pixel of attention with respect to the center of the photodetecting surface.

16. The color contamination correction method according to claim 12, wherein the value of the correction parameter for each of the pixels around the pixel of attention varies depending on the color of a color filter associated with the pixel around the pixel of attention.

17. The color contamination correction method according to claim 12, wherein sets of correction parameters are held as table data.

18. The color contamination correction method according to claim 12, wherein correction parameters of plural pixels having color filters of the same color among the pixels around the pixel of attention have the same value in common.

19. The color contamination correction method according to claim 12, wherein color contamination correction is performed on shot image signals that are read from the solid-state imaging device in a thinned manner using values of sets of correction parameters that are provided for the entire effective pixel area of the photodetecting surface.

20. The color contamination correction method according to claim 12, wherein when shot image signals of a partial area of the entire effective pixel area of the photodetecting surface are cut out, color contamination correction for the partial area is performed using values of sets of correction parameters that are provided for the entire effective pixel area of the photodetecting surface.

* * * * *